United States Patent [19]
Stephens

[11] 3,842,482
[45] Oct. 22, 1974

[54] METAL FITTINGS TO THERMOPLASTIC COMPONENTS

[75] Inventor: Ronald Bertram Stephens, Beverley, England

[73] Assignee: Armstrong Patents Co. Limited, Yorkshire, England

[22] Filed: Feb. 5, 1973

[21] Appl. No.: 329,556

[30] Foreign Application Priority Data
Feb. 16, 1972  Great Britain...................... 7060/72

[52] U.S. Cl................................. 29/447, 29/212 D
[51] Int. Cl.......................... B23p 11/02, B23q 7/10
[58] Field of Search... 29/447, 212 D, 211 D, 203 B

[56] References Cited
UNITED STATES PATENTS
| | | | |
|---|---|---|---|
| 2,679,913 | 6/1954 | Scott................................. | 29/447 X |
| 3,302,274 | 2/1967 | Stoltz............................... | 29/203 B |
| 3,470,604 | 10/1969 | Zenick................................. | 29/447 |

*Primary Examiner*—Thomas H. Eager
*Attorney, Agent, or Firm*—Diller, Brown, Ramik & Wight

[57] ABSTRACT

Metal fittings such as threaded bushes or studs are secured in a thermoplastic component by forming the fitting with a reduced leading end region which is introduced into a preformed pilot hole in the component, and pressing the fitting into the component whilst applying heat directly to the fitting. Provided that application of heat and pressure is terminated as soon as the fitting is fully inserted, overheating of the thermoplastic material is not possible as increased heat flow from the fitting to the thermoplastic material will merely result in more rapid insertion of the fitting.

There is also described a tool for inserting the fittings into the thermoplastic material.

The described method and tool obviate the need for arranging metal inserts in a mould before a thermoplastic component is moulded and the need for the complex and costly equipment and fittings which have hitherto been necessary for use with preformed thermoplastic components.

8 Claims, 4 Drawing Figures

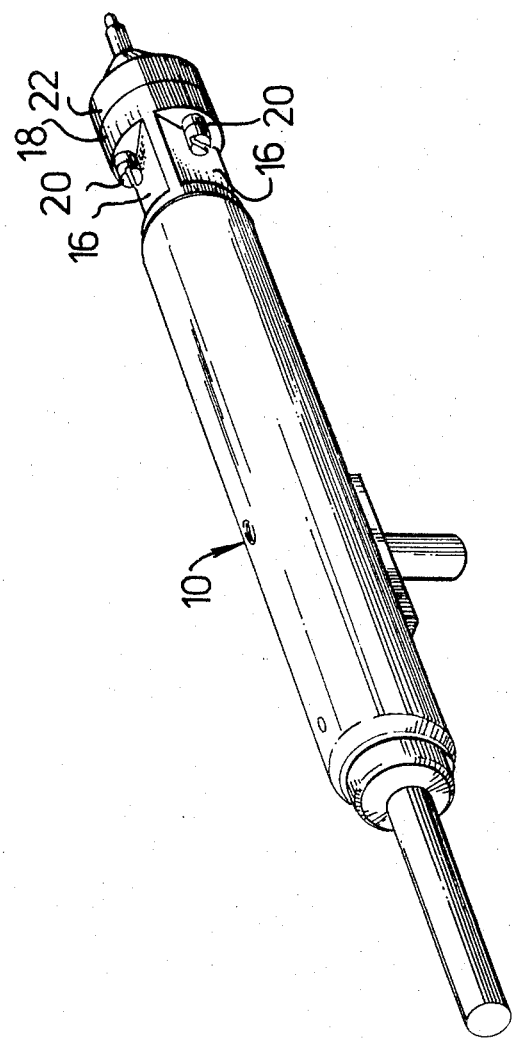

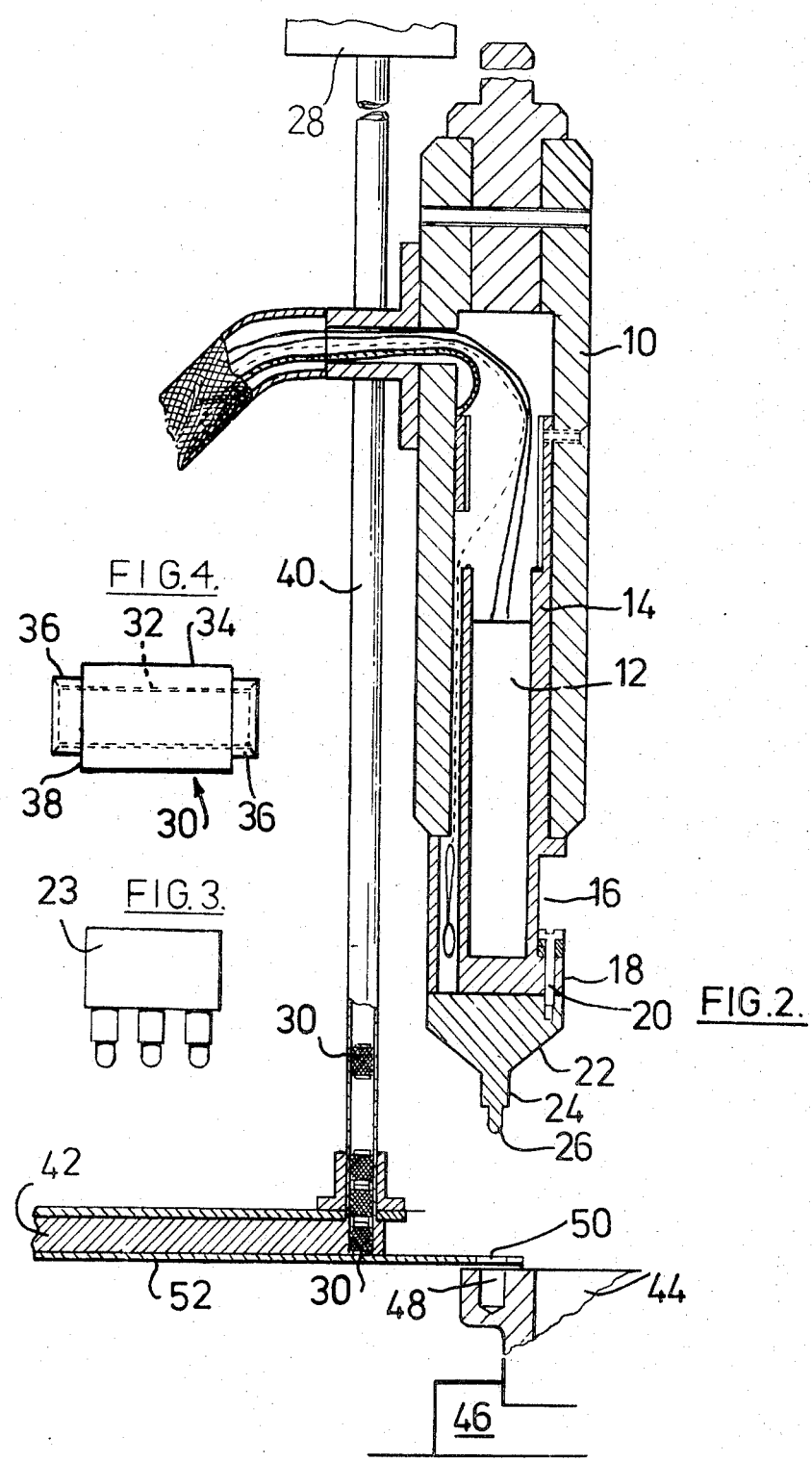

METAL FITTINGS TO THERMOPLASTIC COMPONENTS

This invention concerns the application of metal fittings to thermoplastics components.

Many occasions arise where metal fittings such as studs or internally threaded bushes are required to be secured to or even in thermoplastics components, typical examples being the electrically insulating housings of hair dryers, vacuum cleaners and other domestic machines. Presently available ways of uniting metal fittings with thermoplastics materials, however, can sometimes involve disadvantages or difficulties, either in the moulding operation where the fittings are intended to be moulded integrally into the material or in the expense of ancillary equipment in cases where they are applied subsequently to the moulding of a thermoplastics component.

The invention seeks to provide a method and a tool which will enable metal fittings to be applied to thermoplastics components after the latter have been moulded and without requiring the use of extensive ancillary equipment.

According to one feature of the present invention a method for applying metal fittings to thermoplastics components comprises forming a metal fitting with at least one reduced end region constituting a leading end intended for offering to a thermoplastics components, preforming a pilot hole in the thermoplastics component to a transverse dimension or dimensions capable of accepting and preliminarily locating the leading end of a metal fitting therein, introducing said end of such fitting into said pilot hole with the opposite end of the fitting upstanding from said thermoplastics component, applying heat directly to said fitting to effect a local softening of the thermoplastics material around said hole, exerting a mechanical pressure on said fitting sufficient to cause at least the region of said fitting adjoining said leading end to penetrate into said component, and thereafter cooling or allowing the softened thermoplastics material to cool and harden thereby securing said fitting in said component.

Where the fitting is required to resist axial and/or torque loads the region adjoining its leading end is preferably provided with a fluted, grooved, roughened, barbed or knurled surface into the openings or interstices of which the softened material may flow and act on hardening to locate the fitting into the thermoplastics component.

Heat and pressure may be applied by a tool held manually but alternatively the tool may be mounted in a head or slide which is mechanically displaceable towards and away from the thermoplastics component in which case the latter may be temporarily located in a jig, clamp or the like. Where a mechanically displaceable head or slide is used, several tools may be mounted therein to effect simultaneous application of a plurality of fittings to the thermoplastics component. The invention further envisages that, where the metal fitting is of a suitable nature, both its ends may be made of identical shape so that both are capable of acting as leading ends, in which event the fitting may be fed to the thermoplastics component as by reciprocating slide means which receives them from a storage hopper and positions them one at a time in preformed pilot holes in said component, movement of the heat and pressure applying tool towards and away from the thus positioned fittings being effected in timed relation to the slide movement.

According to a still further feature of the invention, a preferred tool for use in carrying out the method aforesaid comprises an electrically heated metal sleeve received within an insulating housing, the sleeve having a free end projecting from said housing, and a relatively massive metal thrust member detachably secured in intimate heat transfer relation to the free end of the sleeve, said thrust member being provided with a portion shaped and dimensioned closely to engage a fitting with which it is intended to co-operate in heat transfer and pressure transmitting relation.

The thrust member may, for example, be provided with a probe-like extension or tip which at its free extremity may be dimensioned to engage closely within an aperture formed in the leading end of the fitting or it may alternatively have a recess or socket at that extremity in order to engage closely over said end.

The invention will be described further, by way of example, with reference to the accompanying drawings, in which:

FIG. 1 is a perspective view of a heat and pressure applying tool according to the invention;

FIG. 2 illustrates schematically the incorporation of that tool in apparatus for automatically applying metal inserts to a thermoplastics workpiece, the tool itself being illustrated in axial section;

FIG. 3 is a detail showing a modified thrust member for the tool; and

FIG. 4 is an illustration of a preferred form of metal insert.

As shown in the drawings the heat and pressure applying tool comprises a housing 10 which is made of a ceramic or asbestos material providing both heat and electrical insulation. Within the housing 10 there is arranged (FIG. 2) an electrical heating element 12 fitting closely within a heavy metal sleeve 14 which has one end projecting beyond the housing. The sleeve 14 is formed at its free end with three equiangularly spaced recesses 16 and terminates beyond the recesses 16 in a circular flange 18. Centrally of each recess 16, the flange 18 is bored in an axially parallel direction and screws 20 passed through those bores act to retain a relatively massive thrust member 22 tightly against the axial end face of the flange 18 and thus an intimate heat transfer relationship with the sleeve 14. The recesses 16 facilitate screwdriver access to the screws 20.

The thrust member 22 has an axially directed tip 24 which at its free end terminates in a reduced diameter portion 26 dimensioned to fit within the axial bore 32 of the metal insert 30 illustrated in FIG. 4. It will be appreciated that the reduced diameter portion 26 of the thrust member tip 24 will require to be differently dimensioned for each size of insert 30 with which it is intended to co-operate and it is for this reason that the thrust member 22 is detachably secured to the sleeve 14 by way of screws 20. The screws 20 ensure that the thrust member 22 is not readily dislodged accidentally from the sleeve 14 and maintain the thrust member in its required intimate contact with the flange 18 whilst permitting a rapid change of thrust member when the necessity arises. It is, of course, alternatively possible to provide the flange end 18 and thrust member 22 with appropriately dimensioned and complementarily threaded regions by which the two may be secured in threaded engagement or to provide a bayonet fitting connection between them or simply to make them a push fit one within the other.

Although the tool as thus far described may be held and used manually, it is equally suitable for use in automatic machine assemblies such as that diagrammatically illustrated in FIG. 2, where metal inserts 30 are fed from a storage hopper 28 and by way of a feed tube 40 to a reciprocating slide 42 which is driven towards and away from a workpiece 44 held in a jig 46. At the completion of its movement towards the workpiece 44, the slide 42 registers the metal insert 30 which it is then carrying with a preformed hole 48 provided within the workpiece, the jig 46 being arranged in such a manner as to register the hole 48 in axial alignment with the tip 24 of the tool thrust member 22. In this position, the hole 48 is also in register with and beneath a hole 50 provided at the free end of a table 52 on which the slide 42 reciprocates. Thus, at the end of the forward movement of the slide, the metal insert 30 carried by the slide 42 engages with its leading end into the hole 48.

As shown in FIG. 4, the metal insert 30 has a central portion 34 provided with a roughened surface and reduced diameter end portions or spigots 36. When used in the apparatus illustrated in FIG. 2, each insert 30 is fed by the slide 42 in such a manner as to engage one of the spigots 36 in the hole 48, the spigots and the hole having almost commensurate diameters.

Relative movement between the slide 42 and the tool is so timed that as the slide withdraws the tool descends to engage the tip portion 26 into the bore 32 of the insert 30. Due to its massive configuration, the thrust member 22 constitutes a good heat reservoir and maintains the tip portion 26 at an elevated temperature. Engagement of the tip portion 26 within the metal insert 30 accordingly effects a rapid heating of the insert 30 which, in conjunction with the mechanical pressure applied to the insert as a result of the downward movement of the tool, sets up a local softening of the thermoplastic material in the immediate vicinity of the hole 28 and enables the insert 30 to penetrate into the workpiece 44. The extent of the tool movement towards the workpiece is calculated to press the insert fully into the hole 48 in such a manner that the free axial end face of the then uppermost spigot 36 is coplanar with the upper surface of the workpiece. The softened thermoplastic material in the meanwhile penetrates and flows along the interstices of the roughened surface of the insert 30 and additionally closes over the shoulder 38 defined between the spigot 36 and the central body portion 34 of the insert, having the surface of the plastics material substantially undisturbed. This serves firmly to lock the insert against axial movement relative to the workpiece whilst resistance to torque loads is provided as a result of the flow of thermoplastic, material into the interstices of the roughened surface.

Although the tool in FIG. 2 is illustrated as having a thrust member provided with only a single tip 24 it is, of course, possible to substitute a thrust member having a multiple tip configuration should this be required and an example of such a modified member 23 is shown in FIG. 3.

An advantageous feature of the apparatus and method described is that the rate of penetration of an insert into the thermoplastics material and the rate of heat transfer from the heated tip to the insert are governed solely by the rate of local melting of the thermoplastics material. Overheating of the insert and excessive melting of the thermoplastics material cannot occur since an increase in heat flow from the tip to the insert would merely accelerate melting of the thermoplastics material and penetration of the insert into the thermoplastics material thus causing a decrease in heat transfer time. Only the amount of heat necessary to melt the thermoplastics material sufficiently to allow penetration of the insert is taken from the tip so that the temperature of the tip is not critical.

I claim:

1. A method for applying metal fittings to thermoplastics components, comprising the steps of forming a metal fitting with at least one reduced end region constituting a leading end intended for offering to a thermoplastics component, preforming a pilot hole in the thermoplastics component to a transverse dimension or dimensions capable of accepting and preliminarily locating the leading end of a metal fitting therein, introducing said end of such fitting into said pilot hole with the opposite end of the fitting upstanding from said thermoplastics component, applying heat directly to said fitting to effect a local softening of the thermoplastics material around said hole, exerting a mechanical pressure on said fitting sufficient to cause at least the region of said fitting adjoining said leading end to penetrate into said component, and thereafter cooling or allowing the softened thermoplastics material to cool and harden thereby securing said fitting in said component.

2. A method as claimed in claim 1 in which the metal fitting is provided at a region adjoining said leading end with a surface formation into which the softened thermoplastics material flows and with which the thermoplastics material interlocks.

3. A method as claimed in claim 1 in which both ends of the fitting are reduced end regions.

4. A method as claimed in claim 1 in which a plurality of fittings are applied simultaneously.

5. The method of claim 1 wherein the heating of said fitting and exerting of the mechanical pressure on the fitting is accomplished by common means.

6. The method of claim 5 wherein the fitting is automatically positioned relative to the thermoplastics component and the heating of the fitting and the exerting of the mechanical pressure on the fitting is effected in timed relation to the positioning of the fitting.

7. The method of claim 6 wherein the fitting is positioned by transverse movement into alignment with the thermoplastics component.

8. The method of claim 1 wherein a plurality of the fittings are sequentially positioned and simultaneously applied.

* * * * *